United States Patent
Becker et al.

(10) Patent No.: US 8,331,492 B2
(45) Date of Patent: Dec. 11, 2012

(54) DEVICE AND METHOD FOR DETERMINING THE DEVIATION OF THE CARRIER FREQUENCY OF A MOBILE RADIO DEVICE FROM THE CARRIER FREQUENCY OF A BASE STATION

(75) Inventors: Burkhard Becker, Ismaning (DE); Holger Neuhaus, München (DE)

(73) Assignee: Intel Mobile Communications GmbH, Neubiberg (DE)

( * ) Notice: Subject to any disclaimer, the term of this patent is extended or adjusted under 35 U.S.C. 154(b) by 2379 days.

(21) Appl. No.: 11/028,158

(22) Filed: Jan. 3, 2005

(65) Prior Publication Data

US 2005/0117665 A1     Jun. 2, 2005

Related U.S. Application Data

(63) Continuation of application No. PCT/DE03/02026, filed on Jun. 17, 2003.

(30) Foreign Application Priority Data

Jul. 4, 2002 (DE) .................................. 102 30 150

(51) Int. Cl.
*H03K 9/00* (2006.01)

(52) U.S. Cl. ........................................ 375/316; 375/226

(58) Field of Classification Search .................. 375/316, 375/326, 339, 364, 344, 347, 142, 226
See application file for complete search history.

(56) References Cited

U.S. PATENT DOCUMENTS

| | | | | |
|---|---|---|---|---|
| 6,463,048 B1 * | 10/2002 | Garyantes | ...................... | 370/342 |
| 6,590,945 B1 * | 7/2003 | Brardjanian et al. | .......... | 375/340 |
| 6,606,363 B1 * | 8/2003 | Atarius et al. | ................ | 375/362 |
| 6,996,156 B1 * | 2/2006 | Ono | .............................. | 375/147 |
| 7,002,946 B2 * | 2/2006 | Sendonaris | .................... | 370/342 |
| 2003/0087620 A1 * | 5/2003 | Sendonais | ...................... | 455/266 |
| 2007/0060095 A1 * | 3/2007 | Subrahmanya et al. | ... | 455/343.1 |

FOREIGN PATENT DOCUMENTS

| | | |
|---|---|---|
| EP | 1 133 093 A1 | 9/2000 |
| EP | 1 184 991 A2 | 2/2001 |
| WO | WO 01/59937 A2 | 8/2001 |
| WO | WO 01/86904 A1 | 11/2001 |
| WO | WO 02/27956 | * 4/2002 |

* cited by examiner

*Primary Examiner* — Aristocratis Fotakis
(74) *Attorney, Agent, or Firm* — Dickstein Shapiro LLP

(57) ABSTRACT

A device for determination of the frequency discrepancy (105) between a mobile radio and a base station which is transmitting a sequence of symbols, having a unit (6-11) for calculation of terms, with one term being formed from two symbols in the sequence received by the mobile radio, and in which case the phase difference of the two symbols can be determined from the term, a unit (14, 15) for formation of groups from the terms, with one term being assigned to one group on the basis of features of the symbols on which it is based, and a unit (39) for calculation of the discrepancy (105) on the basis of a group.

22 Claims, 3 Drawing Sheets

DEVICE AND METHOD FOR DETERMINING THE DEVIATION OF THE CARRIER FREQUENCY OF A MOBILE RADIO DEVICE FROM THE CARRIER FREQUENCY OF A BASE STATION

CROSS-REFERENCE TO RELATED APPLICATION

This application is a continuation of copending International Application No. PCT/DE03/02026 filed Jun. 17, 2003 which designates the United States, and claims priority to German application no. 102 30 150.6 filed Jul. 4, 2002.

TECHNICAL FIELD OF THE INVENTION

The present invention relates to a device by means of which it is possible to determine the discrepancy between the carrier frequency of a mobile radio and the carrier frequency of a base station. The invention also relates to a corresponding method.

DESCRIPTION OF RELATED ART AND BACKGROUND OF THE INVENTION

In order to transmit symbols between a base station and a mobile radio, the symbols are modulated onto a carrier frequency in the transmitter, and are demodulated in the receiver. In this case, the mobile radio must use the same carrier frequency as the base station. However, if there is a discrepancy in the carrier frequency in the mobile radio, the discrepancy must be determined in order subsequently to allow it to be compensated for. A frequency discrepancy such as this in the mobile radio may be caused, for example, by tolerances of the oscillator which produces the carrier frequency. A further cause of frequency shifts may be temperature fluctuations. Furthermore, movements of the mobile radio with respect to the base station lead to Doppler frequency shifts.

As a rule, the phase difference between two successive symbols which are received by the mobile radio is measured in order to determine the discrepancy between the carrier frequency of the mobile radio, in which case it may firstly be necessary to demodulate a known data sequence, which is modulated onto the symbols. Since the received symbols are complex symbols, they can be represented by pointers on the complex number plane. If the two symbols were the same when they generated in the base station, the rotation angle of the associated pointer in the complex numerical plane can be considered for the phase difference between the two received symbols. The phase difference represents a direct measure of the frequency difference between the carrier frequency of the base station and the carrier frequency of the mobile radio.

In the UMTS (Universal Mobile Telecommunications System) Standard, the frequency error of the mobile radio can be determined with the aid of the pilot signal (common pilot channel; CPICH). The pilot signal is a signal which is transmitted by the base station and by means of which the same pilot symbol or a continuously recurring pattern of two different pilot symbols is transmitted continuously. The pilot signal is therefore particularly suitable for the phase difference measurement described above.

The pilot symbols which are received by the mobile radio are referred to in the following text as $r_k$ with the integer index k indicating the time sequence of the pilot symbols $r_k$. The frequency discrepancy $\Delta f$ can be calculated using the following equation (1) from the phase difference $\Delta\phi$ measured between two directly successively received pilot symbols $r_{k-1}$ and $r_k$:

$$\Delta f = \frac{\Delta\varphi}{2\pi T_s} \qquad (1)$$

where the time $T_s$ denotes the time interval between the transmission of the pilot symbols $r_{k-1}$ and $r_k$. The pilot symbol rate is calculated from $1/T_s$, and is 15 kHz in the UMTS Standard.

A complex product $U_k$ can be formed from the pilot symbol $r_k$ and the complex-conjugate pilot symbol $r_{k-1}{}^*$:

$$U_k = r_{k-1}{}^* \cdot r_k \qquad (2)$$

The argument of the complex product $U_k$ indicates the phase difference $\Delta\phi$:

$$\Delta\varphi = \arg(U_k) = \arctan\left(\frac{\operatorname{Im}\{U_k\}}{\operatorname{Re}\{U_k\}}\right) \qquad (3)$$

The above equations (1) to (3) provide a calculation rule by means of which the frequency discrepancy $\Delta f$ of the mobile radio can be estimated. The unambiguity range $|\Delta f|$ of this estimate is given by:

$$|\Delta f| < \frac{1}{2T_s} = 7.5 \text{ kHz} \qquad (4)$$

For small phase differences $\Delta\phi$, the variance $\operatorname{var}(\Delta(\phi))$ in the distribution of the phase difference $\Delta\phi$ for additive white Gaussian noise with a signal-to-noise ratio $E_s/N_0$ and averaging over L values can be calculated approximately as follows:

$$\operatorname{var}(\Delta\varphi) = \frac{1}{2L^2 \frac{E_s}{N_0}} + \frac{1}{2L\left(\frac{E_s}{N_0}\right)^2} \qquad (5)$$

So far, two pilot symbols $r_k$ and $r_{k-1}$ have been considered, which follow one another directly in the time sequence of the pilot symbols. However, the analysis of two pilot symbols $r_k$ and $r_{k-D}$, which are separated from one another by D symbols in the time sequence of the pilot symbols has certain advantages. In order to make these advantages plausible, the parameter D must be taken into account in the equations (2), (4) and (5):

$$U_k = r_{k-D}^* \cdot r_k \qquad (6)$$

$$|\Delta f| < \frac{1}{2T_s D} = \frac{7.5 \text{ kHz}}{D} \qquad (7)$$

$$\operatorname{var}(\Delta\varphi) = \frac{1}{2DL^2 \frac{E_s}{N_0}} + \frac{1}{2D^2 L\left(\frac{E_s}{N_0}\right)^2} \qquad (8)$$

The advantage of the introduction of the parameter D can be seen from equation (8): an increase in the parameter D leads to a reduction in the variance $\operatorname{var}(\Delta\phi)$. However, an increase in the parameter D in equation (7) also leads to a reduction in the unambiguity range $|\Delta f|$.

When the base station is being operated in the STTD (Space Time Transmit Diversity) mode, the radio signal is transmitted from two base station antennas. In this case, the complex product $U_k$ must be calculated separately for the two antennas.

In the case of known mobile radios, the discrepancy between the carrier frequency of the mobile radio and the carrier frequency of the base station is calculated completely in the firmware by means of a digital signal processor. If a number of base stations and a number of transmission paths for each base station are investigated in this case, then all of the data is transmitted on a path-specific basis to the digital signal processor. This leads to a high work load on both the digital signal processor and the data bus via which the data is transmitted.

SUMMARY OF THE INVENTION

The object of the invention is to provide a device for determination of the discrepancy between the carrier frequency of a mobile radio and the carrier frequency of a base station, in which device the necessary computation operations are carried out with little effort. A further aim is to specify a corresponding method.

The object on which the invention is based can be achieved by a device for determination of the discrepancy between the carrier frequency of a mobile radio and the carrier frequency of at least one base station, with a sequence of complex pilot symbols which is known in the mobile radio being transmitted by radio from each base station to the mobile radio, comprising a first unit for calculation of terms, with one term being formed from at least two different pilot symbols in the sequence received by the mobile radio, and in which case the phase difference between the two pilot symbols can be determined from the term, a second unit for formation of groups from the terms, with one term being assigned to one group on the basis of features of the pilot symbols on which it is based, and a third unit for calculation of the frequency discrepancy on the basis of the terms in at least one group.

The first unit and the second unit can be in the form of a hard-wired circuit. The third unit can be in the form of a digital signal processor. The first unit can be designed to calculate complex products, with a complex product being formed from at least two different pilot symbols in the sequence received by the mobile radio, and the argument of the complex product indicating the phase difference between the two pilot symbols. The first unit may have a multiplier with a first input and a second input, the first input can be preceded by a circuit branch which contains a delay element and a unit for formation of the complex-conjugate value from a complex value, and the circuit branch can be fed from the one pilot symbol, and the second input can be fed from the other pilot symbol. The delay time of the delay element can be set and can be predetermined. The delay element can be formed by a rewritable memory. An accumulator for adding up a variable number of terms can be arranged between the first unit and the second unit. The second unit can be designed such that the terms, or possibly the accumulated terms, in a group are added up. A rewritable memory in which the terms in the groups, or possibly the accumulated terms in the groups, can be stored. The first unit and the second unit, and possibly the accumulator, can each be duplicated. The two first units can be preceded by a fourth unit for separation of the received pilot symbols on the basis of the associated antennas of the base station which is transmitting the pilot symbols. The first unit, or, if appropriate, the fourth unit, can be preceded by a rewritable memory. The third unit can be designed to average terms or groups of terms. The device may further comprise a control unit for formation of groups, and in particular for controlling the accumulation of terms in the predetermined groups. The groups can be formed on the basis of the association of the pilot symbols on which the terms are based with base stations and/or with transmission paths.

The object can also be achieved by a method for determination of the discrepancy between the carrier frequency of a mobile radio and the carrier frequency of at least one base station, with a sequence of complex pilot symbols which is known in the mobile radio being transmitted by radio from each base station to the mobile radio, comprising the steps of calculating terms, with one term being formed from at least two different pilot symbols in the sequence received by the mobile radio, and in which case the phase difference between the at least two pilot symbols can be determined from the term, forming of groups from the terms, with one term being assigned to one group on the basis of features of the pilot symbols on which it is based, and calculating the frequency discrepancy on the basis of the terms in at least one group.

Complex products can be calculated in step (a), with a complex product being formed from at least two different pilot symbols in the sequence received by the mobile radio, and the argument of the complex product indicating the phase difference between the at least two pilot symbols. The terms in a group can be added up in step (b). The groups can be formed on the basis of the association of the pilot symbols on which the terms are based with base stations and/or with transmission paths. The in each case two pilot symbols of the terms from which a group is formed can be separated from one another in the sequence of the pilot symbols by a predetermined number of digits. A group can be formed twice, with the two groups differing in the number of digits by which the pilot symbols on which their terms are in each case based, are separated from one another.

The device according to the invention makes it possible to determine the discrepancy between the carrier frequency of a mobile radio and the carrier frequency of at least one base station using the UMTS Standard. For this purpose, each base station transmits a sequence of complex pilot symbols, which are known in the mobile radio, by radio to the mobile radio. The device according to the invention has a first, a second and a third unit. The first unit is used to calculate terms. One term is formed from at least two different pilot symbols in the sequence received by the mobile radio. Furthermore, the phase difference between the two pilot symbols can be determined from a term. The second unit is used to form groups from the terms, with one term being sorted into one group on the basis of features or characteristics of the pilot symbols on which it is based. The third unit is used to calculate the frequency discrepancy on the basis of the terms in at least one group.

The features or characteristics of the pilot symbols on the basis of which the pilot symbols are sorted into groups relate, for example, to the association with a specific base station from which the pilot symbols were transmitted, or the path via which the pilot symbols were transmitted, or the transmission mode (STTD, Normal Mode) of the pilot symbols. The device according to the invention can obtain information about such features or characteristics from, for example, the RAKE receiver in which the pilot symbols are obtained by demodulation from pilot signals.

One advantage of the invention is the combination of the terms to form groups. The third unit, which carries out the final computation operations for determination of the frequency discrepancy, does not need to be supplied with all the terms as individual results, by virtue of the formation of groups, but only with the respective intermediate results for the groups. This reduces the amount of data transferred on the data bus which is arranged between the second and the third unit, and the third unit has to carry out fewer computation operations. A further advantage of the formation of groups is that the groups can be formed on the basis of criteria which are worthwhile for the further calculations, and involve little effort. For example, it is advantageous to combine in a group the terms which relate to selection of the strongest-signal transmission paths from each base station. This can contribute to a reduction in the Doppler effect. The combination of a number of paths for result formation also increases the result quality when using diversity.

The first unit and the second unit are advantageously in the form of hard-wired circuits. This measure is advantageous since the work steps to be carried out by the first and second units are admittedly computation-intensive, but are uncomplicated and can thus be carried out easily by hardware.

A further advantageous refinement of the invention provides for the third unit to be formed by a digital signal processor. This ensures that the device according to the invention has a high degree of flexibility. Furthermore, the computation operations relating to the calculation of the frequency discrepancy to be carried out by the digital signal processor are few in number, so that the digital signal processor has sufficient remaining computation capacity for other tasks. For example, the digital signal processor can also predetermine the criteria on the basis of which the terms are sorted into groups in the second unit. The digital signal processor can also carry out further control tasks.

According to one preferred refinement of the invention, the first unit is designed to calculate complex products, with a complex product being formed from at least two different pilot symbols in the sequence received by the mobile radio, and the argument of the complex product indicating the phase difference between the two pilot symbols. As an alternative to this type of calculation, the phase angles of the at least two different pilot symbols could also first of all be calculated separately from one another, with it being possible for the phase difference to then be calculated from the phase angles.

The first unit preferably contains a multiplier, which has a first input and a second input. The first input is preceded by a circuit branch which contains a delay element and a unit for transformation of a complex value to its complex-conjugate value. The circuit branch is fed with the one pilot symbol, and the second input is fed with the other pilot symbol.

The delay time in the delay element can advantageously be varied and predetermined.

The delay element may, for example, be formed by a rewrittable memory. Before being emitted, a pilot symbol is temporarily stored in the rewriteable memory for as long as it corresponds to the delay time assigned to this pilot signal.

Furthermore, it is also possible in a preferred manner to provide for an accumulator, which in each case adds up a variable number of terms, to be arranged between the first unit and the second unit.

The terms, or possibly the accumulated terms, in a group, are advantageously added up in the second unit.

It is also advantageous to provide a rewritable memory in which the integration results for the groups can be temporarily stored. A group can thus be accessed quickly as soon as there is a new term to be added to this group.

One particularly preferred refinement of the invention provides for the first unit and the second unit, and possibly the accumulator, each to be duplicated. This measure is particularly advantageous when a base station from which the mobile radio receives pilot signals is being operated in the STTD operating mode. Each base station antenna then provides a dedicated processing path for the pilot symbols.

When the base station is being operated in the STTD operating mode, it is also advantageous for the first two units to be preceded by a fourth unit, which separates the received pilot symbols on the basis of the associated antennas.

The first unit or, if appropriate, the fourth unit, is preferably preceded by a rewritable memory. The rewritable memory is used to decouple the RAKE receiver in the mobile radio from the downstream units in the device according to the invention.

A further preferred refinement of the invention provides for the capability to form mean values from terms or from groups of terms within the third unit.

The device according to the invention preferably has a control unit. The control unit can, inter alia, carry out control tasks relating to the formation of the groups. In particular, the control tasks may include controlling the accumulation of the terms in the predetermined groups. The control unit can also carry out further tasks, such as presetting the delay times for the delay elements. If required, the digital signal processor can carry out tasks for the control unit.

One major aspect of the invention relates to the features of the pilot symbols on the basis of which the groups are formed. These features advantageously relate to the associated base station and to the associated transmission paths. By way of example all the terms which are obtained from pilot symbols from the same base station can be combined to form one group. It is likewise feasible to combine those terms which are obtained from specific transmission paths in one group. In this case, by way of example, it is possible to provide for the terms relating to the strongest signal transmission paths from one base station to be combined in one group. This would reduce the effects of the Doppler frequency shift, caused by movement of the mobile radio, in the results for this group. As an alternative to this, the transmission paths of different base stations can be subdivided between different groups. This makes it possible to calculate the Doppler frequency shift for a specific base station. The terms can always be assigned to two or more groups whenever the groups are formed. Furthermore, the groups can be defined such that they extend over more than one cell.

The method according to the invention is used to determine the discrepancy between the carrier frequency of a mobile radio and the carrier frequency of at least one base station. A sequence of complex pilot symbols which is known in the mobile radio is transmitted by radio from each base station to the mobile radio. In order to determine the carrier frequency discrepancy, terms are calculated in a first method step which are each formed from at least two different pilot symbols in the sequence received by the mobile radio. The phase difference between the two pilot symbols can be determined from one term. In a second method step, groups are formed from the terms, with one term being assigned to one group on the basis of features of the pilot symbols on which it is based. In a third method step, the carrier frequency discrepancy is calculated on the basis of the terms in at least one group.

The combination of the terms according to the invention to form groups makes it possible to determine the frequency discrepancy more efficiently than can be done using conventional methods. For example, a frequency shift caused by the Doppler effect can be reduced by suitable group selection.

The two pilot symbols from each of which one term in one group is formed are preferably separated from one another by a predetermined number of digits in the sequence of the pilot symbols.

According to one particularly preferred refinement of the method according to the invention, the calculations for a group are carried out twice, with the two calculations differing in that a different number of digits separating the pilot symbols which are used for the calculations is chosen in each case. This number of digits can be expressed, for example, by the parameter D, which is introduced in the equations (6) to (8). For example, it is possible to provide for a group to be formed first of all in which a value greater than unity is used for parameter D, so that the variance in the phase difference measurement and thus the frequency estimation error are comparatively small. Furthermore, the calculations, which are otherwise the same, are carried out with the value 1 for the parameter D. This makes it possible to check whether the smaller unambiguity range |Δf| of the calculation is not left with the larger value for the parameter D.

BRIEF DESCRIPTION OF THE DRAWINGS

The invention will be explained in more detail in the following text with reference, by way of example, to the drawings, in which.

DETAILED DESCRIPTION OF EMBODIMENTS

Figure 1:
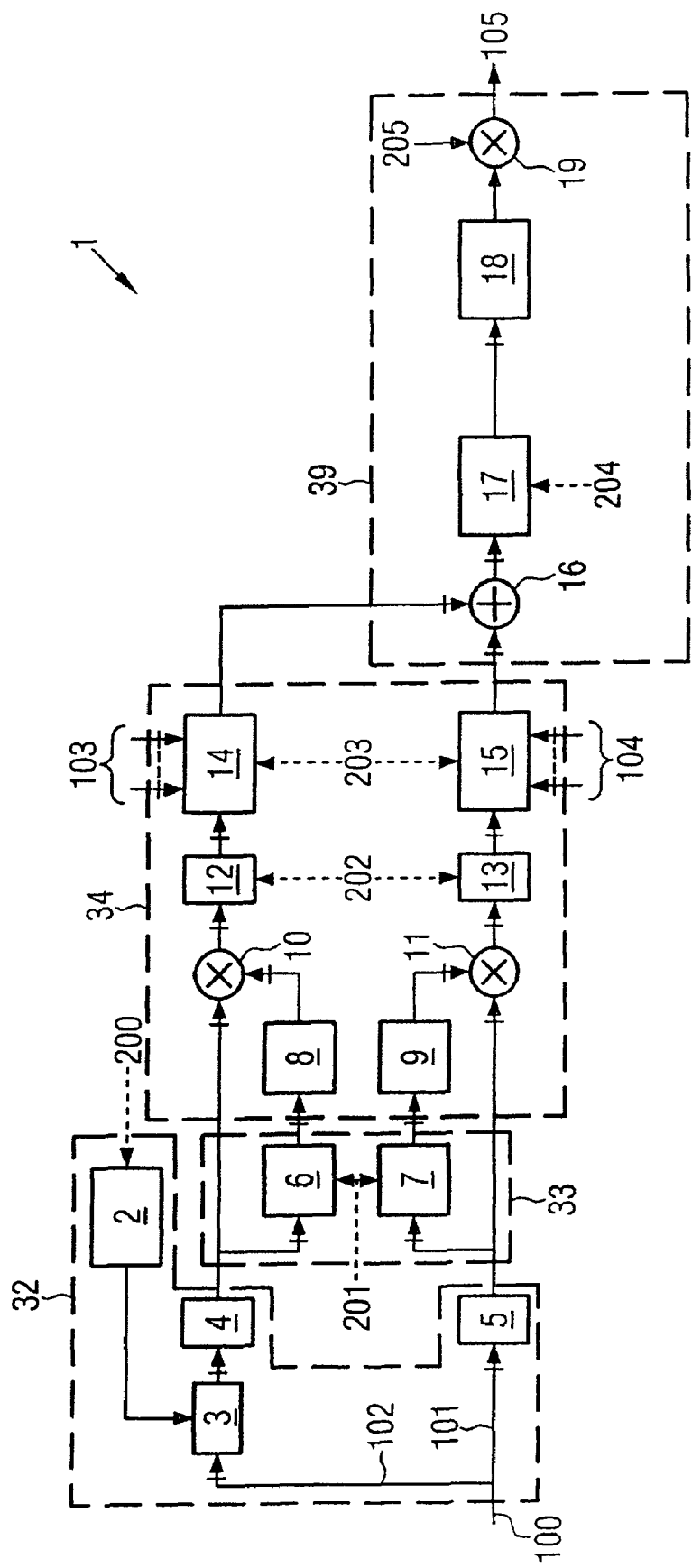
FIG. 1 shows a schematic circuit diagram of a circuit which can be integrated in one exemplary embodiment of the invention.
Figure 3:
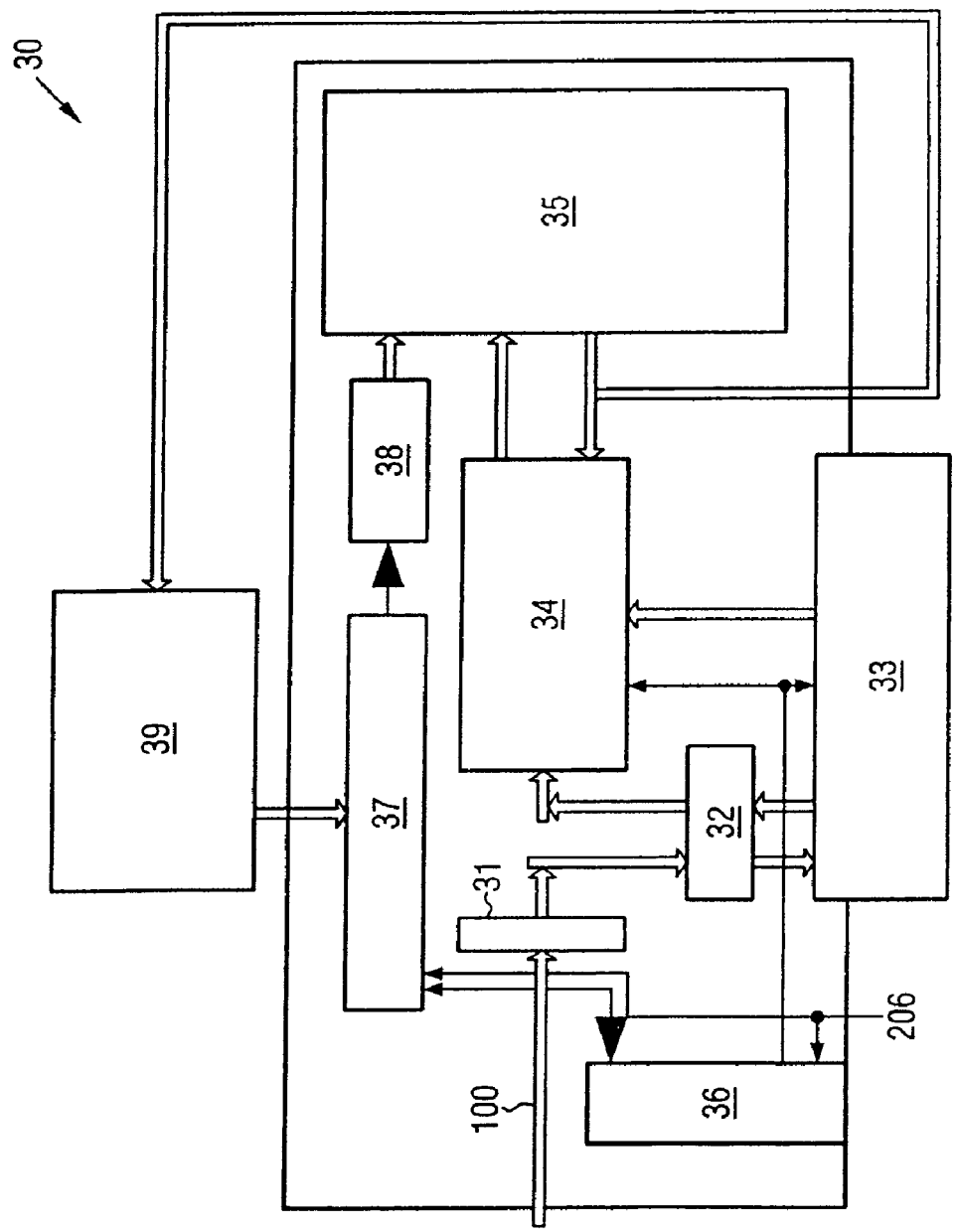
FIG. 3 shows a schematic circuit diagram of the exemplary embodiment of the device according to the invention.

FIG. 1 shows the schematic circuit diagram of a circuit 1, which may be a component of one exemplary embodiment of the device according to the invention, as shown in FIG. 3. Since the method of operation of the exemplary embodiment shown in FIG. 3 results from the method of operation of the circuit 1, the circuit 1 must be explained first of all.

The circuit 1 is integrated in a mobile radio. Pilot signals received by the mobile radio are demodulated in a RAKE receiver, and are converted to pilot symbols 100. The pilot symbols 100 are passed to the circuit 1 at a data rate of, for example, 15 ks/s. This example is based on the assumption that the base station from which the pilot symbols 100 were originally transmitted is being operated using the STTD operating mode. In the STTD operating mode, the base station transmits its signals with the aid of two antennas 1 and 2. The pilot symbols 100 are split in the circuit 1 into two data paths, with the pilot symbols 101 associated with the antenna 1 being processed in one data path, and the pilot symbols 102 associated with the antenna 2 being processed in the other data path.

The data paths which are fed from the pilot symbols 101 and 102 are illustrated one above the other in FIG. 1. The upper data path relates to the antenna 2 for the base station. A mathematical sign unit 3 and an accumulator 4 are connected in series in this data path. The mathematical sign unit 3 has a control input which is connected to the output of an STTD coding unit 2. The STTD coding unit 2 is controlled by a control signal 200. The output of the accumulator 4 is connected both to one input of a multiplier 10 and to the input of a delay element 6. The delay element 6 is controlled by a control signal 201. The delay element 6 is followed by a conjugation unit 8. The output of the conjugation unit 8 is connected to a further input of the multiplier 10. An accumulator 12 and a grouping unit 14 are arranged in series, in the stated sequence, downstream from the multiplier 10. The accumulator 12 is controlled by a control signal 202, and the grouping unit 14 is controlled by a control signal 203. Furthermore, further data 103 is fed into the grouping unit 14. The data 103 may be the intermediate result of an integration of terms within one group. This will be explained further below in conjunction with the description relating to FIG. 3. The output of the grouping unit 14 is fed to one input of an adder 16.

The data path associated with the antenna 1 is constructed in a similar manner to the data path associated with the antenna 2.

For this purpose, this data path has an accumulator 5, a delay element 7, a conjugation unit 9, a multiplier 11, an accumulator 13 and a grouping unit 15. The output of the grouping unit 15 is connected to a further input of the adder 16. In contrast to the data path which is fed from the pilot symbols 102, the data path which is fed from the pilot symbols 101 does not have a mathematical sign unit or an STTD coding unit.

In the same way as the delay element 6, the delay element 7 is controlled by the control signal 201. Furthermore, the accumulator 13 is controlled by the control signal 202, and the grouping unit 15 is controlled by the control signal 203. Data which, like the data 103, may be the intermediate results of integration of terms within one group is, furthermore, entered in the grouping unit 15.

The adder 16 is followed by an averaging unit 17 and a calculation unit 18, as well as a multiplier 19. The averaging unit 17 is controlled by a control signal 204. The multiplier 19 is fed with a value 205, in addition to the output value from the calculation unit 18. The multiplier 19 produces an output value 105.

Figure 2:
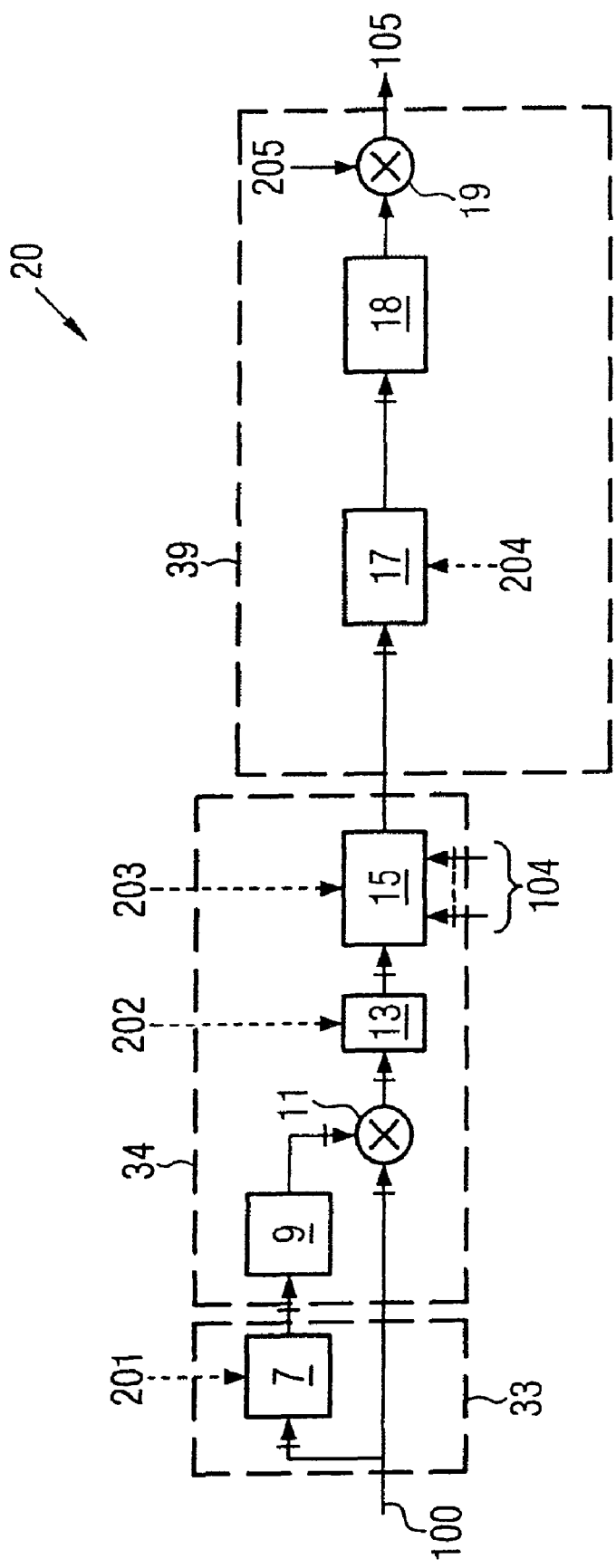
FIG. 2 shows a schematic circuit diagram of a further circuit which can be integrated in the exemplary embodiment of the invention.

As in FIG. 2, which will be described further below, the data paths in FIG. 1 on which complex-value data is transmitted are represented by arrows, with an additional vertical bar before the arrow head. Data paths and signal paths on which purely real data or signals are transmitted are represented by arrows without vertical bars. The control signals in FIGS. 1 and 2 are identified by dashed arrows.

In the STTD operating mode, the base station antenna 1 transmits the pilot symbol A=1+j ten times in each time slot, where j denotes the imaginary unit. Ten pilot symbols are likewise transmitted in each time slot from the base station antenna 2, although the pilot symbol −A=−1−j can also be transmitted, in addition to the pilot symbol A. The pilot symbols which are transmitted by the antenna 2 in each frame can be subdivided into units each having four pilot symbols, with each unit having the pattern A, −A, −A, A formed from the four pilot symbols. This pattern is irregular only at the frame boundary.

Once the pilot signals have been received in the mobile radio, two successive pilot symbols from each antenna are in each case convolved. The convolution of the pilot symbols transmitted from the antenna 1 is carried out in the accumulator 5, where two successive pilot symbols are added up. The sum is then passed to the delay element 7 and to the multiplier 11. This procedure is dependent on a convolution value being emitted from the accumulator 5 only in every alternate processing clock cycle, so that the data rate downstream from accumulator 5 is reduced from 15 ks/s to 7.5 ks/s.

Two successive pilot symbols are likewise added up during the convolution of the pilot symbols transmitted from the antenna 2. However, in this case, it should be noted that some of these pilot symbols have a negative mathematical sign. In order to prevent the convolution leading to an incorrect result, such as 0, or −2A, the mathematical sign of each pilot symbol −A must be inverted before the convolution process. This is done by means of the mathematical sign unit 3. The information as to which pilot symbol should be inverted is passed to the mathematical sign unit 3 from the STTD coding unit 2, in which the pattern of pilot symbols transmitted from the base station antenna 2 is stored. Furthermore, the STTD coding unit 2 requires information about the start of the frame, in order to control the mathematical sign unit 3. This information is provided for the STTD coding unit 2 by the control signal 200. Once the negative mathematical sign has been removed from the pilot symbols transmitted from the antenna 2, two successive pilot symbols are added in the accumulator 4, in the same way as in the accumulator 5. This convolution process always results in the value 2A. The data rate is likewise reduced to 7.5 ks/s downstream from the accumulator 5.

A complex product based on the equation (6) is formed from the convolution values produced by the respective accumulator 4 or 5 and with the aid of the respective delay element 6 or 7, the respective conjugation unit 8 or 9 and the respective multiplier 10 or 11, with the values $r_{k-D}$ and $r_k$ in equation (6) being replaced by convolution values. For this purpose, a convolution value located in the delay element 6 or 7 is not emitted again until the respective accumulator 4 or 5 has produced the D-th subsequent convolution value. The magnitude of the parameter D is passed to the delay elements 6 and 7 by means of the control signal 201. The convolution value which is emitted from the respective delay element 6 or 7 is converted to complex-conjugate form by means of the conjugation unit 8 or 9, respectively. In this case, the mathematical sign of the imaginary part of the convolution value is inverted. During the subsequent multiplication process in the respective multiplier 10 or 11, the convolution value which was emitted from the respective accumulator 4 or 5 in the respective processing clock cycle is multiplied by the delayed and conjugated convolution value, which is emitted at the same time from the respective conjugation unit 8 or 9. A predetermined number of complex products are then added up in the respective accumulator 12 or 13. The number of successive complex products which are in each case added up by the accumulators 12 and 13 is predetermined by the control signal 202.

In the present case, the summation process extends over four complex products in each case.

The sum of complex products which is produced by the respective accumulator 12 or 13 is supplied to the respective grouping unit 14 or 15. Furthermore, the respective grouping unit 14 or 15 receives the respective data 103 or 104, which it adds up as intermediate results of an integration within a group with the data provided by the respective accumulator 12 or 13.

The convolution values emitted from the respective accumulator 4 or 5 are referred to in the following text as $P_i^j$. In this case, the index j(j=1, 2) denotes the antenna from which the associated pilot symbols were transmitted, and the integer index i indicates the time sequence of the convolution values. The following value is obtained after passing through the respective grouping unit 14 or 15:

$$\sum_{m}^{M} \sum_{i=1}^{4} (P_{m,i-D}^{j*} \cdot P_{m,i}^{j}) \quad (9)$$

In the present case, the respective accumulator 12 or 13 adds four of the products $P_{m,i-D}^{j*} \cdot P_{m,i}^{j}$ which are emitted from the respective multiplier 10 or 11. This accumulation process is controlled by the control signal 202. The respective grouping unit 14 or 15 adds the sums emitted from the respective accumulator 12 or 13, on the basis of the control signal 203, to the data items 103 and 104, respectively. This is denoted by the summation index m in the term (9). The way in which the summation index m denotes the summation results of the respective accumulator 12 or 13 which should be joined together to form a specific group result will be explained further below. By way of example, the index m can be used to denote all the propagation paths within a cell over which the results from the respective accumulator 12 or 13 are intended to be added up. In this example M denotes the number of propagation paths within this cell.

All of the processing steps which are carried out before the calculation of the terms (9) are carried out in the circuit 1 by means of a hardware circuit. Only the outputs of the grouping units 14 and 15 feed firmware, in which the further calculations to determine the frequency discrepancy are carried out by means of a digital signal processor 39. The units and circuit elements which are arranged in the digital signal processor 39 in FIG. 1 should thus be regarded as calculation rules for an algorithm which is processed in the digital signal processor 39.

The terms which are emitted from the grouping units 14 and 15 are added by means of the digital signal processor 39. A mean value is then formed over a specific averaging time period. These two steps are denoted by the adder 16 and the averaging unit 17 in FIG. 1. The averaging time period is supplied to the averaging unit 17 by means of the control signal 204. The averaging process reduces the data rate downstream from the averaging unit 17 to a value of 7.5/averaging time period ks/s.

The phase difference $\Delta\phi$ is calculated using equation (3) from the mean value, by inserting the mean value for the complex product $U_k$ into the right-hand side of equation (3). The calculation unit 18 is provided in the circuit 1 for this calculation step.

On the basis of equation (1), the phase difference $\Delta\phi$ must be multiplied by the factor $1/(2\pi T_s)$. In doing so, it must be remembered that, in the present case, the convolution of in each case two pilot symbols in the accumulators 4 and 5 means that the time $T_s$ must be doubled. Furthermore, the parameter D must be taken into account. These considerations result in a factor of $1/(4\pi T_s D)$, where the factor $1/T_s$ represents the pilot symbol rate at which the pilot symbols are transmitted by the base station. For the UMTS Standard, this pilot symbol rate is 15 kHz. The multiplication by the factor $1/(4\pi T_s D)$ is carried out in FIG. 1 by means of the multiplier 19, to which the factor $1/(4\pi T_s D)$ is supplied by the value 205. This multiplication process produces the frequency discrepancy $\Delta f$ as the output value 105.

FIG. 2 shows the schematic circuit diagram of a circuit 20 which, like the circuit 1, can be integrated in the exemplary embodiment of the invention as shown in FIG. 3.

In contrast to the circuit 1 shown in FIG. 1, the circuit 20 is designed to process pilot symbols which have been received from a base station being operated in the normal operating mode. In the normal operating mode, a base station transmits signals via only one antenna.

The circuit 20 is based on the circuit 1, by cutting out the upper data path of the circuit 1 in which the pilot symbols 102 associated with the antenna 2 are processed. In comparison to the circuit 1, the circuit 20 also has no accumulator 5 which, for example in the circuit 1, could be bridged in order to produce the circuit 20, nor does it have the adder 16, whose function would have to be deleted from the processing algorithm in the digital signal processor 39.

FIG. 2 illustrates the circuit 20 resulting from this. Similar or identical circuit elements, signals or calculation rules to those in FIG. 1 have the same reference symbols in FIG. 2. It should be noted that the addition process in the accumulator 13 in the circuit 20 is carried out over 8 complex products $U_k$. By analogy with the term (9), this results in a term (10) which is emitted from the grouping unit 15:

$$\sum_{m}^{M} \sum_{k=1}^{8} (r_{m,k-D}^* \cdot r_{m,k}), \quad (10)$$

In the term (10) the integer index k, which is predetermined by the control signal 202, indicates the time sequence of the pilot symbols $r_k$.

Furthermore, in the case of the circuit 20, it should be noted that the value 205 by which the phase difference $\Delta\phi$ is multiplied is $1/(2\pi T_s D)$.

Except for the averaging process in the averaging unit 17, the data rate in the circuit 20 has a value of 15 ks/s. Downstream from the averaging unit 17, the data rate is 15/averaging time period ks/s.

As an exemplary embodiment of the device according to the invention, FIG. 3 shows a circuit 30 for determination of the discrepancy in the carrier frequency of a mobile radio. The circuits 1 and 20 which are shown in FIGS. 1 and 2 can be integrated in the circuit 30.

The circuit 30 is supplied, like the circuits 1 and 20, with pilot symbols 100 which have been demodulated by the RAKE receiver in the mobile radio. The pilot symbols 100 are first of all passed to a buffer store 31, which is used to decouple the RAKE structure from the downstream components of the circuit 30.

The pilot symbols 100 then pass through a decoupling unit 32, whose task when the base station has been operated in the STTD operating mode is to separate the pilot symbols 100 on the basis of the respective antenna. The circuit 1 which is illustrated in FIG. 1 relates to the STTD operating mode. The decoupling unit 32 is likewise shown in FIG. 1 and comprises the STTD coding unit 2, the mathematical sign unit 3 and the accumulators 4 and 5. The antenna decoupling is carried out in the decoupling unit 32, as described above, by convolution of two successive pilot symbols. For this purpose, the first pilot symbol to arrive is first of all temporarily stored in a buffer store 33 downstream from the decoupling unit 32. As soon as the second pilot symbol arrives in the decoupling unit 32, the pilot symbol which has been temporarily stored in the buffer store is loaded in the decoupling unit 32 once again, so that the convolution of the two pilot symbols can be carried out there. The convolution value obtained in this way can then be stored in the buffer store 33.

If the base station from which the pilot symbols 100 have been transmitted is being operated in the normal operating mode, the pilot symbols 100 are written directly to the buffer store 33. This is the base station operating mode for which the circuit 20 shown in FIG. 2 is designed.

The convolution values and pilot symbols which are temporarily stored in the buffer store 33 are read to a hard-wired calculation unit 34 in order to process them further. The circuit elements which are part of the calculation unit 34 are illustrated in FIGS. 1 and 2 for both operating modes of the base station. The calculation unit 34 contains the conjugation units 8 and 9, the multipliers 10 and 11, the accumulators 12 and 13 as well as the grouping units 14 and 15. The calculation unit 34 can be based on a circuit part of a circuit which is used for SINR (Signal to Interference and Noise Ratio) calculations in order to reduce the circuitry complexity.

In this case, it should be noted that the delay elements 6 and 7 in the circuit 30 are formed by the buffer store 33. Those convolution values and pilot symbols which are intended to be supplied to the multiplier 10 or 11, respectively, without any delay are passed directly from the decoupling unit 32 to the calculation unit 34. Those convolution values and pilot symbols which are intended to be delayed by means of the respective delay element 6 or 7 are temporarily stored in the buffer store 33, and are not passed to the calculation unit 34 until a later time.

The calculation unit 34 carries out the integration on the basis of the equation (10) or (9). Intermediate values of the summation process are temporarily stored in a buffer store 35 which is connected downstream from the calculation unit 34. As soon as a further pilot symbol or convolution result (summation index k or i in the respective equation (10) or (9)), or a contribution to the accumulation of a group result (summation index m in the equations (9) and (10)) is present, the temporary summation results are loaded from the buffer store 35 in the calculation unit 34 as data 103 or 104, and the summation process is added to or completed on the basis of the equation (10) or (9).

The method described above is particularly suitable for the situation in which the pilot symbols 100 are supplied successively from time-division-multiplexed RAKE fingers, and in which a group association has been forced on the pilot symbols 100 on the basis of the association of the RAKE fingers with specific propagation paths within specific cells. This is expressed by the index m in the equations (9) and (10). Furthermore, the pilot symbols 100 are transmitted in accordance with a defined transmission sequence using the time slot pattern or frame pattern in a time sequence, and are demodulated by the RAKE fingers using the time-division multiplex method. In this case, demodulated pilot symbols 100 are supplied from the time-division-multiplexed RAKE fingers after in each case 256 chips.

The aim of passing the data 103 and/or 104 back to the calculation unit 34 is to in each case combine the complex terms emitted from the accumulators 12 and 13 to form groups, in a flexible manner. The complex terms which are intended to be combined in one specific group may, for example, be associated with a specific path on which the signals are transmitted from a specific base station to the mobile radio. It is also possible to provide for the complex terms which are associated with a number of transmission paths from one specific base station to be added up in one group. A further grouping option is characterized in that the complex terms of the strongest signal paths from one or more base stations are integrated in one group. In the end, the user decides which groups will be formed.

In order to calculate a group result, the respective grouping unit 14 or 15 is provided with the intermediate results by means of the data 103 or 104, with these intermediate results containing the complex terms for this group which have been added up so far. Once a further complex term which has been produced by the respective accumulator 12 or 13 has been added to the previous sum in the respective grouping unit 14 or 15, the new intermediate result is stored in the buffer store 35 once again. As soon as a new complex term associated with this group has been calculated in the respective accumulator 12 or 13, the intermediate result is once again loaded into the respective grouping unit 14 or 15. The combination of the complex terms $$\sum_{i=1}^{4} (P_{m,i-D}^{j*} \cdot P_{m,i}^{j}) \quad \text{and} \quad \sum_{k=1}^{8} (r_{m,k-D}^{*} \cdot r_{m,k})$$

to form groups is taken into account by the index m in the terms (9) and (10).

After completion of the group-by-group integration, the results for one group are supplied to a digital signal processor 39, which carries out the further calculations in order to determine the frequency discrepancy Δf. FIGS. 1 and 2 show the computation steps to be carried out by the digital signal processor 39, by means of the adder 16, the averaging unit 17, the calculation unit 18 and the multiplier 19. It is also feasible for the individual processing steps which are associated with the digital signal processor 39 in the present exemplary embodiment to be carried out in hardware.

Generally, the frequency discrepancy Δf is calculated for at least two different parameters D. By way of example, the values 1 and 4 may be chosen for the parameter D.

In addition to its task relating to the calculation of the frequency discrepancy Δf, the digital signal processor 39 also carries out control tasks relating to the formation of the groups. The digital signal processor 39 determines, for example, which groups are formed, and supplies appropriate presets to a control unit 37. The control unit 37 controls an address generation unit 38. The address generation unit 38 presets the addresses in the buffer store 35 in which the intermediate results produced by the calculation unit 34 for the individual groups are stored. In consequence, the address generation unit 38 can also (for a specific preset of the digital signal processor 39) select the intermediate results which are intended to be loaded as data 103 or 104 into the grouping unit 14 or 15.

Furthermore, the circuit 30 has a control unit 36. The control unit 36 receives control signals 206 from the RAKE receiver. The control signals 206 contain information about the RAKE finger with which the pilot symbols 100 arriving in the circuit 30 are associated. This means that the control unit 36 receives, by means of the control signals 206 and the configuration data in the control unit 37, information about the associated base station, the operating mode of the base station and the transmission path of the pilot symbols 100.

When the information about the association of a received pilot symbol 100 with a specific RAKE finger is signaled by means of the control signal 206, the configuration data in the control unit 37 can be used to determine which transmission path the relevant RAKE finger receives within which cell. The transmission mode can also be identified on the basis of the determined base station. As further information, this RAKE finger is associated with a specific group about which the results have been accumulated.

Furthermore, control signals are interchanged bidirectionally between the control units 36 and 37. The control signals 206 produced by the RAKE receiver are likewise supplied to the control unit 37.

The control unit 36 uses the information passed to it to control the buffer store 33 by means of the control signal 201, and to control the calculation unit 34 by means of the control signals 202 and 203. Furthermore, the control unit 36 signals to the calculation unit, 34 the operating mode in which the base station associated with the pilot symbols 100 is being operated. In consequence, the calculation unit 34 can be configured on the basis of the circuit 1 or the circuit 20.

We claim:

1. A device for determining the discrepancy between the carrier frequency of a mobile radio and the carrier frequency of at least one base station, with a sequence of complex pilot symbols which is known in the mobile radio being transmitted by radio from each base station to the mobile radio, comprising:
   a first unit configured to calculate terms, with one term being formed from at least two different pilot symbols in the sequence received by the mobile radio, and in which case the phase difference between the two pilot symbols can be determined from the one term;
   a second unit configured to form groups from the terms, with at least one term being assigned to one group on the basis of features of the pilot symbols on which the at least one term is based; and
   a third unit configured to calculate the frequency discrepancy on the basis of the terms in at least one group.

2. The device as claimed in claim 1, wherein the first unit and the second unit are in the form of a hard-wired circuit.

3. The device as claimed in claim 1, wherein the third unit is in the form of a digital signal processor.

4. The device as claimed in claim 1, wherein the first unit is configured calculate complex products, with a complex product being formed from at least two different pilot symbols in the sequence received by the mobile radio, and the argument of the complex product indicating the phase difference between the two pilot symbols.

5. The device as claimed in claim 2, wherein the first unit comprises a multiplier with a first input and a second input;
   the first input is preceded by a circuit branch which comprises a delay element and a unit configured to form of the complex-conjugate value from a complex value; and
   the circuit branch is fed from the one pilot symbol, and the second input is fed from the other pilot symbol.

6. The device as claimed in claim 5, wherein the delay time of the delay element can be set and can be predetermined.

7. The device as claimed in claim 5, wherein the delay element is formed by a rewritable memory.

8. The device as claimed in claim 1, wherein an accumulator configured to add a variable number of terms is arranged between the first unit and the second unit.

9. The device as claimed in claim 1, wherein the second unit is further configured to add the terms, or the accumulated terms, in a group.

10. The device as claimed in claim 1, comprising a rewritable memory configured to store the terms in the groups, or the accumulated terms in the groups.

11. The device as claimed in claim 1, wherein the first unit and the second unit, and the accumulator, are each duplicated.

12. The device as claimed in claim 11, wherein the two first units are preceded by a fourth unit configured to separate the received pilot symbols on the basis of the associated antennas of the base station which is transmitting the pilot symbols.

13. The device as claimed in claim 12, wherein the first unit, or, if appropriate, the fourth unit, is preceded by a rewritable memory.

14. The device as claimed in claim 1, wherein the third unit is further configured to average terms or groups of terms.

15. The device as claimed in claim 1, comprising a control unit configured to form groups, and in particular configured to control an accumulation of terms in the predetermined groups.

16. The device as claimed in claim 1, wherein
the groups are formed on the basis of the association of the pilot symbols on which the terms are based with base stations and/or with transmission paths.

17. A method for determination of the discrepancy between the carrier frequency of a mobile radio and the carrier frequency of at least one base station, with a sequence of complex pilot symbols which is known in the mobile radio being transmitted by radio from each base station to the mobile radio, comprising:
(a) calculating terms, with one term being formed from at least two different pilot symbols in the sequence received by the mobile radio, and in which case the phase difference between the at least two pilot symbols can be determined from the one term;
(b) forming of groups from the terms, with at least one term being assigned to one group on the basis of features of the pilot symbols on which the at least one term is based; and
(c) calculating the frequency discrepancy on the basis of the terms in at least one group.

18. The method as claimed in claim 17, wherein complex products are calculated in step (a), with a complex product being formed from at least two different pilot symbols in the sequence received by the mobile radio, and the argument of the complex product indicating the phase difference between the at least two pilot symbols.

19. The method as claimed in claim 17, wherein
the terms in a group are added up in step (b).

20. The method as claimed in claim 17, wherein
the groups are formed on the basis of the association of the pilot symbols on which the terms are based with base stations and/or with transmission paths.

21. The method as claimed in claim 17, wherein
the in each case two pilot symbols of the terms from which a group is formed are separated from one another in the sequence of the pilot symbols by a predetermined number of digits.

22. The method as claimed in claim 21, wherein
a group is formed twice, with the two groups differing in the number of digits by which the pilot symbols on which their terms are in each case based, are separated from one another.

* * * * *